United States Patent
Kawade et al.

(10) Patent No.: US 11,046,345 B2
(45) Date of Patent: Jun. 29, 2021

(54) TIPPING PREVENTION UNIT, FEEDING APPARATUS, AND IMAGE FORMING APPARATUS

(71) Applicant: CANON KABUSHIKI KAISHA, Tokyo (JP)

(72) Inventors: Takaaki Kawade, Odawara (JP); Tomoki Katafuchi, Suntou-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 401 days.

(21) Appl. No.: 15/888,902

(22) Filed: Feb. 5, 2018

(65) Prior Publication Data
US 2018/0222515 A1   Aug. 9, 2018

(30) Foreign Application Priority Data

Feb. 7, 2017   (JP) .............................. JP2017-020048

(51) Int. Cl.
| | |
|---|---|
| *B62B 5/04* | (2006.01) |
| *B60T 3/00* | (2006.01) |
| *B60T 1/04* | (2006.01) |
| B60B 33/02 | (2006.01) |
| B60B 33/00 | (2006.01) |
| B60P 3/077 | (2006.01) |
| B65G 69/00 | (2006.01) |

(Continued)

(52) U.S. Cl.
CPC ............... B62B 5/049 (2013.01); B60T 1/04 (2013.01); B60T 3/00 (2013.01); B60B 33/00 (2013.01); B60B 33/0089 (2013.01); B60B 33/021 (2013.01); B60P 3/077 (2013.01); B62B 2301/00 (2013.01); B65G 69/005 (2013.01); G03G 15/6502 (2013.01); G03G 21/1604 (2013.01)

(58) Field of Classification Search
CPC .. B60T 3/00; B62B 5/049; B62B 5/00; B62B 5/0423; B60B 33/0089; B60B 33/0086; B60B 33/0081; B60B 33/00; B60B 33/021; B60B 2900/3312; B60P 3/077; G03G 21/16; G03G 21/1619; B60R 25/093

See application file for complete search history.

(56) References Cited

U.S. PATENT DOCUMENTS

| | | | | |
|---|---|---|---|---|
| 719,699 A | * | 2/1903 | Sears ....................... | B60T 3/00 188/37 |
| 1,687,631 A | * | 10/1928 | Oberwegner ......... | B60B 33/021 16/34 |

(Continued)

FOREIGN PATENT DOCUMENTS

| | | | | |
|---|---|---|---|---|
| DE | 29623170 U1 | * | 11/1997 | ................ B60T 3/00 |
| DE | 102006040173 A1 | * | 3/2008 | ............. B62B 5/049 |

(Continued)

*Primary Examiner* — Jonathan Liu
*Assistant Examiner* — Taylor L Morris
(74) *Attorney, Agent, or Firm* — Canon U.S.A., Inc., IP Division

(57) ABSTRACT

A tipping prevention unit that prevents tipping of an image forming apparatus includes shafts holding a wheel of the image forming apparatus, a shaft that abuts the image forming apparatus at a position higher than the shafts, and a shaft that contacts a floor surface on which the image forming apparatus is placed at a position further protruding to the outside of the image forming apparatus than the wheel of the image forming apparatus.

4 Claims, 10 Drawing Sheets

(51) Int. Cl.
*G03G 15/00* (2006.01)
*G03G 21/16* (2006.01)

(56) References Cited

U.S. PATENT DOCUMENTS

| | | | | |
|---|---|---|---|---|
| 2,812,041 A * | 11/1957 | Mugler | ............... | B60B 33/021 |
| | | | | 188/74 |
| 3,065,827 A * | 11/1962 | Timbers | ............... | B60T 3/00 |
| | | | | 188/32 |
| 3,279,753 A * | 10/1966 | Ventriglio | ............... | B65H 49/32 |
| | | | | 254/8 R |
| 3,625,313 A * | 12/1971 | Lowrie | ............... | B60T 3/00 |
| | | | | 188/4 R |
| 3,652,103 A * | 3/1972 | Higgs | ............... | B62B 5/0423 |
| | | | | 280/33.994 |
| 3,858,838 A * | 1/1975 | Woodhouse | ............... | A47B 95/043 |
| | | | | 248/345.1 |
| 3,949,444 A * | 4/1976 | Mattinson | ............... | B60B 33/0089 |
| | | | | 16/35 R |
| 4,025,099 A * | 5/1977 | Virden | ............... | B60B 33/00 |
| | | | | 293/58 |
| 4,354,604 A * | 10/1982 | Isaacs | ............... | B62B 3/00 |
| | | | | 188/32 |
| 4,503,943 A * | 3/1985 | Tsukui | ............... | A47D 13/043 |
| | | | | 16/34 |
| 4,853,742 A * | 8/1989 | Payrhammer | ............... | B65H 19/12 |
| | | | | 355/27 |
| 4,923,346 A * | 5/1990 | Hager | ............... | B60P 3/077 |
| | | | | 16/35 R |
| 5,284,410 A * | 2/1994 | Sare | ............... | B60B 33/00 |
| | | | | 188/69 |
| 5,333,477 A * | 8/1994 | Davis | ............... | B60R 25/093 |
| | | | | 188/32 |
| 5,444,949 A * | 8/1995 | Ciaccio | ............... | B60T 3/00 |
| | | | | 188/32 |
| 5,509,506 A * | 4/1996 | Jones | ............... | B60B 33/021 |
| | | | | 16/35 R |
| 5,513,727 A * | 5/1996 | Belanger | ............... | B60T 3/00 |
| | | | | 188/32 |
| 5,702,117 A * | 12/1997 | Geelhoed | ............... | A61B 6/4405 |
| | | | | 16/18 CG |
| 6,055,704 A * | 5/2000 | Leibman | ............... | B60B 33/06 |
| | | | | 16/32 |
| 6,183,405 B1 * | 2/2001 | Schurig | ............... | B60B 33/0039 |
| | | | | 16/18 B |
| 6,227,540 B1 * | 5/2001 | Nakamura | ............... | B65H 29/60 |
| | | | | 271/303 |
| 6,290,029 B1 * | 9/2001 | Gubler | ............... | B60T 3/00 |
| | | | | 188/36 |
| 6,390,759 B1 * | 5/2002 | Novak | ............... | B62B 5/049 |
| | | | | 188/5 |
| 6,866,274 B1 * | 3/2005 | Muscat | ............... | B62B 1/268 |
| | | | | 280/47.131 |
| 7,020,413 B2 * | 3/2006 | Hatakeyama | ............... | B65H 1/00 |
| | | | | 399/107 |
| 7,264,265 B2 * | 9/2007 | Shapiro | ............... | B62B 5/049 |
| | | | | 280/643 |
| D690,644 S * | 10/2013 | Bowman | ............... | D12/217 |
| 8,678,335 B2 * | 3/2014 | Barja | ............... | A47B 91/12 |
| | | | | 248/346.11 |
| 8,857,774 B2 * | 10/2014 | Aoyama | ............... | B60B 33/0073 |
| | | | | 248/188.8 |
| 9,089,213 B2 * | 7/2015 | Masuda | ............... | F16M 3/00 |
| 9,108,657 B2 * | 8/2015 | Hussain | ............... | B62B 5/0442 |
| 9,586,562 B1 * | 3/2017 | Noonan | ............... | B60T 3/00 |
| 9,937,750 B1 * | 4/2018 | Nelson | ............... | B60B 33/06 |
| 2002/0076309 A1 * | 6/2002 | Duggins | ............... | B60T 3/00 |
| | | | | 414/401 |
| 2006/0182578 A1 * | 8/2006 | Morton | ............... | B62B 3/04 |
| | | | | 414/537 |
| 2007/0051565 A1 * | 3/2007 | Chen | ............... | B62B 9/087 |
| | | | | 188/19 |
| 2008/0185238 A1 * | 8/2008 | Arnold | ............... | B60T 3/00 |
| | | | | 188/32 |
| 2008/0230329 A1 * | 9/2008 | Slager | ............... | B60T 3/00 |
| | | | | 188/32 |
| 2008/0267659 A1 * | 10/2008 | Koyama | ............... | G03G 21/1619 |
| | | | | 399/107 |
| 2008/0272565 A1 * | 11/2008 | Fitzgerald | ............... | B62B 5/0083 |
| | | | | 280/47.35 |
| 2008/0277211 A1 * | 11/2008 | Wolfram | ............... | B60T 3/00 |
| | | | | 188/32 |
| 2010/0263164 A1 * | 10/2010 | Lin | ............... | B60B 33/021 |
| | | | | 16/47 |
| 2011/0061979 A1 * | 3/2011 | Tai | ............... | B62B 5/0438 |
| | | | | 188/22 |
| 2012/0098395 A1 * | 4/2012 | Sato | ............... | H05K 5/0234 |
| | | | | 312/236 |
| 2013/0195503 A1 * | 8/2013 | Nakagaki | ............... | G03G 21/1619 |
| | | | | 399/107 |
| 2013/0280003 A1 * | 10/2013 | Wessel | ............... | B60P 3/077 |
| | | | | 410/30 |
| 2013/0306411 A1 * | 11/2013 | Hussain | ............... | B62B 5/0414 |
| | | | | 188/19 |
| 2014/0238121 A1 * | 8/2014 | Bonacini | ............... | G01D 11/02 |
| | | | | 73/116.01 |
| 2015/0090539 A1 * | 4/2015 | Degnan | ............... | B62B 5/0433 |
| | | | | 188/19 |
| 2015/0245711 A1 * | 9/2015 | Hamaba | ............... | A47B 91/02 |
| | | | | 248/188.8 |
| 2016/0059597 A1 * | 3/2016 | Suzuki | ............... | A01B 1/026 |
| | | | | 347/108 |
| 2018/0086319 A1 * | 3/2018 | Wendling | ............... | B60T 3/00 |
| 2018/0215096 A1 * | 8/2018 | McMahon | ............... | B29C 64/35 |
| 2018/0273073 A1 * | 9/2018 | Martin | ............... | B62B 5/0495 |
| 2019/0381828 A1 * | 12/2019 | Hession | ............... | B60B 33/0015 |
| 2020/0316991 A1 * | 10/2020 | Yeo | ............... | A47B 91/00 |

FOREIGN PATENT DOCUMENTS

| | | | | |
|---|---|---|---|---|
| EP | 0834431 A1 * | 4/1998 | ............ | B65G 69/005 |
| EP | 2589519 A1 * | 5/2013 | ............ | B64F 1/16 |
| FR | 2832112 A1 * | 5/2003 | ............ | B65G 69/005 |
| JP | 54-171055 U | 12/1979 | | |
| JP | 03-4949 U | 1/1991 | | |
| JP | 11-198602 A | 7/1999 | | |
| JP | 2005-306127 A | 11/2005 | | |
| JP | 2006-208757 A | 8/2006 | | |
| JP | 2013-107258 A | 6/2013 | | |
| JP | 2016-161607 A | 9/2016 | | |
| WO | WO-2018182716 A1 * | 10/2018 | ............ | B60T 3/00 |

* cited by examiner

TIPPING PREVENTION UNIT, FEEDING APPARATUS, AND IMAGE FORMING APPARATUS

BACKGROUND OF THE INVENTION

Field of the Invention

The present disclosure relates to a tipping prevention unit provided in a feeding apparatus.

Description of the Related Art

In a large-sized image forming apparatus such as a printer, a copying machine, or a facsimile apparatus, various functions are optionally equipped in the main body of the image forming apparatus. Options to be equipped include a feeding apparatus in which a large number of recording materials such as sheets of paper can be loaded, a post-processing apparatus that performs various post-processing operations such as sorting and bundling discharged recording materials, and an image scanner that reads an image and then sends the image to the image forming apparatus or an apparatus connected thereto. Those options are freely selected by the user as necessary, and are equipped in the main body of the image forming apparatus to form one product.

Feeding apparatuses in which a large number of recording materials can be loaded include a desktop type that is used on a desk or a stand, a floor type that is integral with a carriage so that it can be moved in a state of being attached to the main body of the image forming apparatus, and a compatible type in which the feeding apparatus and the carriage can be separated so that it can be used on both the desktop and the floor.

In the case of the floor type, the entire image forming apparatus is relatively large, and when all the options such as the feeding apparatus, post-processing apparatus, image scanner and the like are all connected to the main body of the image forming apparatus, the entire image forming apparatus becomes tall. Sometimes single-function options are simply combined, and sometimes an article storage shelf or the like is provided in the middle to set the height to such a height that supply of recording materials and maintenance are easily performed.

It is common to provide a large capacity feeding apparatus at the lowermost stage of the main body of the image forming apparatus. On the other hand, when a user using a wheelchair performs a supply operation of recording materials, it is sometimes desirable to perform a supply operation of the recording materials at an intermediate portion of the main body of the image forming apparatus.

When an accommodating tray provided in the large capacity feeding apparatus is pulled out forward and recording materials are loaded, the center of gravity of the entire image forming apparatus moves forward. The higher the center of gravity of the image forming apparatus, the more easily the image forming apparatus tips. When a movable part is moved during operation or maintenance, or when the user applies a force required for the operation, the center of gravity of the image forming apparatus moves and the image forming apparatus tips easily.

Therefore, in order to prevent tipping of the image forming apparatus, an additional supporting member or a tipping prevention unit is provided. Conventionally, as shown in Japanese Patent Laid-Open No. 2013-107258, a tipping prevention unit in a feeding apparatus having a tray accommodating a large number of recording materials has been proposed in which tipping is prevented by setting the pulling amount of the tray at plural stages and regulating the moving amount of the center of gravity of the image forming apparatus.

However, in an image forming apparatus selectively equipped with options of various functions, the user selects an option as necessary. For this reason, the height, weight, center of gravity, etc. of the image forming apparatus greatly differ between a simple configuration with few options and a configuration with all options. In consideration of safety, a tipping prevention unit is necessary.

SUMMARY OF THE INVENTION

In an aspect of the present disclosure, a tipping prevention unit that prevents tipping of an apparatus includes a main body portion of the tipping prevention unit, a holding portion having a plurality of holding shafts protruding from the main body portion, the plurality of holding shafts contacting a wheel of the apparatus and thereby holding the wheel, an abutting portion that abuts the apparatus at a position higher than the holding portion, and a contacting portion that contacts a floor surface on which the apparatus is placed.

Further features of the present disclosure will become apparent from the following description of exemplary embodiments with reference to the attached drawings.

DESCRIPTION OF THE EMBODIMENTS

An embodiment of a feeding apparatus having a tipping prevention unit according to the present disclosure will be specifically described with reference to the drawings.

First Embodiment

First, with reference to FIGS. 1 to 7, the configuration of a feeding apparatus having a tipping prevention unit according to a first embodiment of the present disclosure will be described.

Image Forming Apparatus

Figure 1:
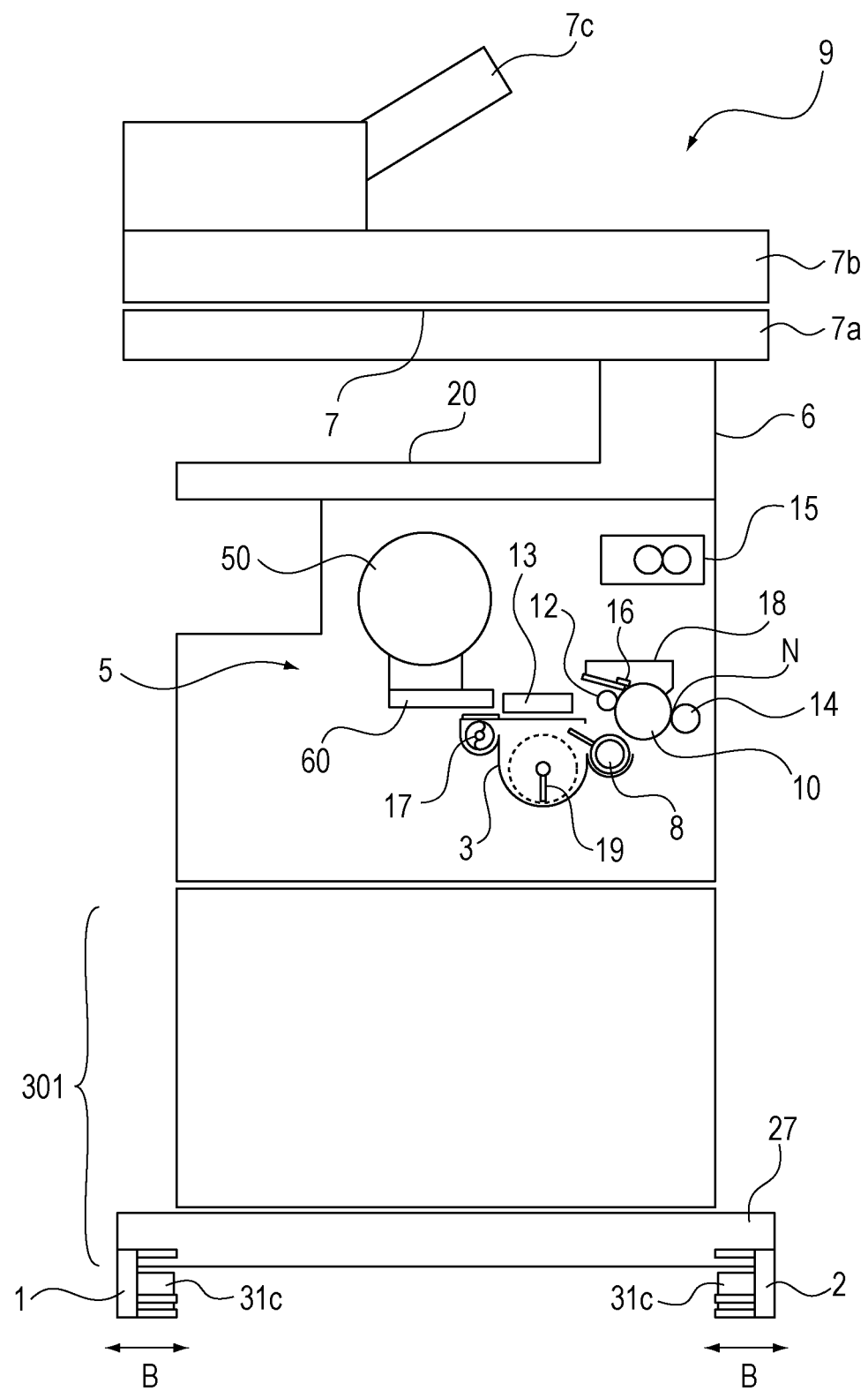
FIG. 1 is a cross-sectional explanatory view showing the configuration of an image forming apparatus to which a tipping prevention unit according to the present disclosure is attached.

First, with reference to FIG. 1, the configuration of an image forming apparatus 9 to which tipping prevention units 1 and 2 according to the present disclosure are attached will be described. FIG. 1 is a cross-sectional explanatory view showing the configuration of the image forming apparatus 9 to which the tipping prevention units 1 and 2 according to the present disclosure are attached. The image forming apparatus 9 shown in FIG. 1 has, for example, a photosensitive drum 10 as an image bearing member made of an organic photosensitive member. The image forming apparatus 9 further has a charging roller 12 serving as a charging unit for uniformly charging the surface of the photosensitive drum 10 rotating counterclockwise in FIG. 1. The image forming apparatus 9 further has a laser scanner 13 serving as an image exposure unit.

The laser scanner 13 emits a laser beam based on image information to the surface of the photosensitive drum 10 uniformly charged by the charging roller 12 to expose it. The image information may be based on data read by an image scanner 7 serving as an image reading unit shown in FIGS. 2 and 3, or data input from an external device.

As a result, an electrostatic latent image is formed on the surface of the photosensitive drum 10. The electrostatic latent image formed on the surface of the photosensitive drum 10 is supplied with toner by a developing sleeve 8 that is provided in a developing device 3 serving as a developing unit and serves as a developer bearing member, and is developed as a toner image.

Reference numeral 50 shown in FIG. 1 denotes a toner bottle that supplies the developing device 3 with toner. Reference numeral 60 denotes a toner conveying path that conveys toner discharged from the toner bottle 50 into the developing device 3. Reference numeral 17 denotes a conveying screw provided in the developing device 3. Reference numeral 19 denotes an agitating member 19 that agitates toner in the developing device 3. Instead of the toner bottle 50, an accommodating portion for accommodating toner may be provided in the developing device 3, and may be attached to and detached from the image forming apparatus 9 as a toner cartridge.

Figure 2:
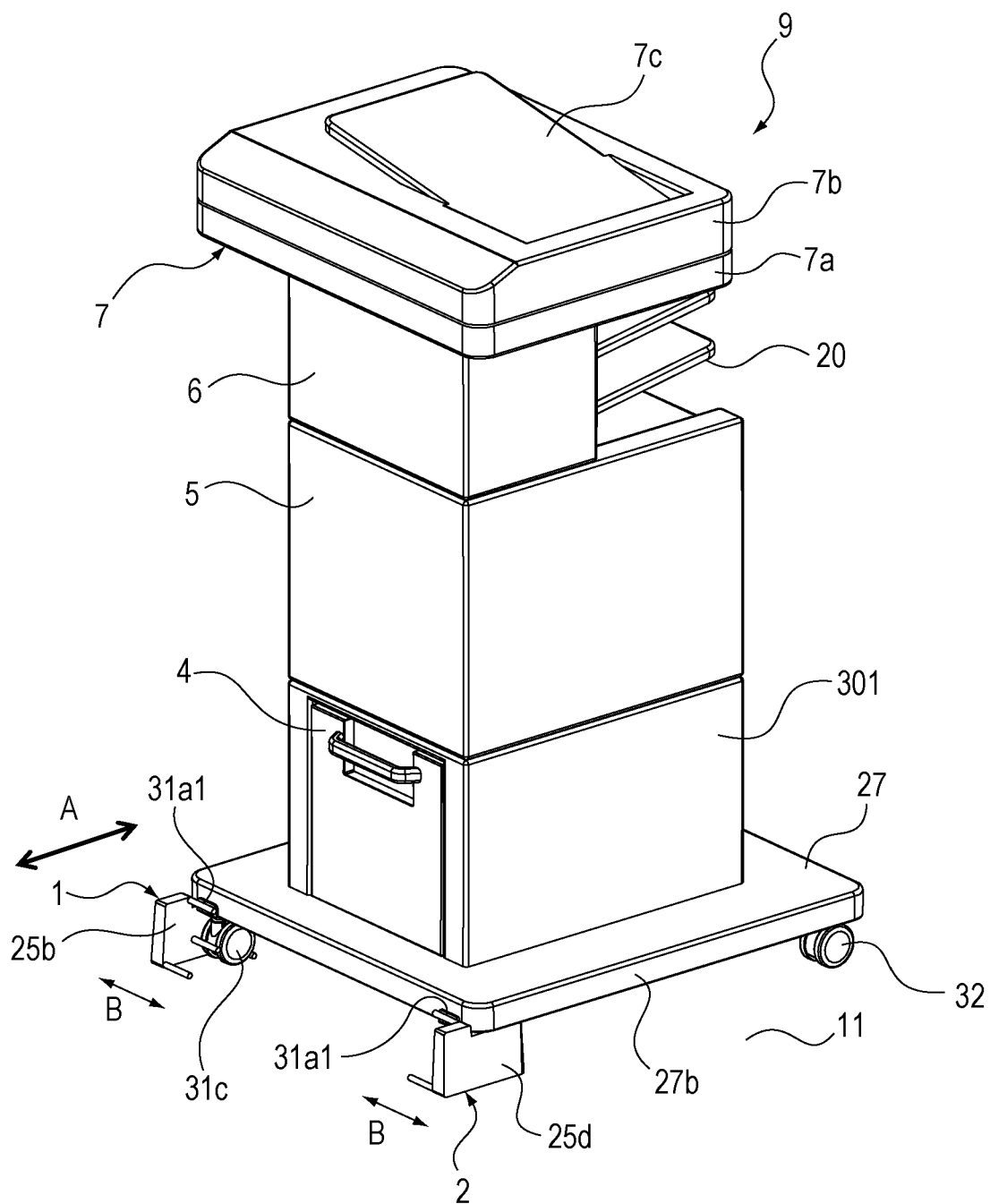
FIG. 2 is a perspective explanatory view showing a state in which tipping prevention units according to a first embodiment are attached to wheels rotatably provided on a lower surface of a base provided in the lower part of the image forming apparatus.
Figure 3:
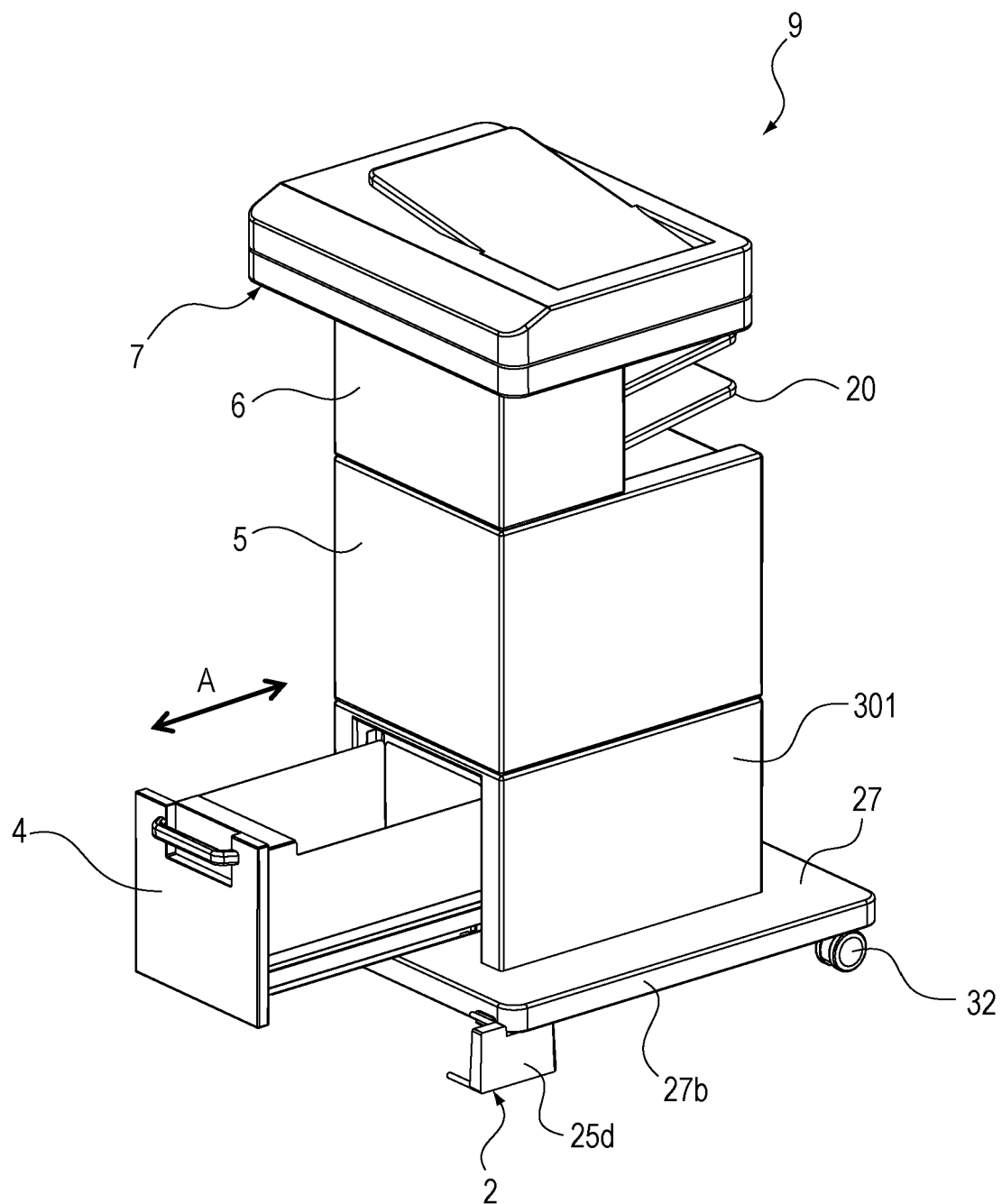
FIG. 3 is a perspective explanatory view showing a state in which an accommodating tray is pulled out, with the tipping prevention units of the first embodiment attached to the wheels rotatably provided on the lower surface of the base provided in the lower part of the image forming apparatus.

On the other hand, a recording material such as paper accommodated in a feeding apparatus 301 for feeding a recording material shown in FIGS. 2 and 3 is fed at a predetermined timing to a transfer nip portion N between the photosensitive drum 10 and a transfer roller 14 serving as a transfer unit by a feeding unit (not shown) serving as a feeding portion for feeding a recording material. The toner image formed on the surface of the photosensitive drum 10 is transferred to the recording material at the transfer nip portion N by applying a transfer bias to the transfer roller 14.

The recording material to which the toner image has been transferred is conveyed to a fixing device 15 serving as a fixing unit and heated and pressed in the process of being nipped and conveyed by a fixing roller and a pressing roller provided in the fixing device 15, and the toner is thermally fused and thermally fixed to the recording material. Thereafter, the recording material is nipped and conveyed by a discharge roller (not shown) and discharged onto a discharge tray 20. Residual toner remaining on the surface of the photosensitive drum 10 without being transferred to the recording material is scraped off by a cleaning blade 16 serving as a cleaning unit and recovered in a recovery container 18.

As shown in FIGS. 1 to 3, an image forming portion 5 is provided in the center of the image forming apparatus 9 in the height direction (vertical direction in FIG. 1). Below the image forming portion 5, the feeding apparatus 301 accommodating a large number of recording materials is provided. Below the feeding apparatus 301, a base 27 serving as a base portion for supporting a feeding portion (not shown) is provided. A post-processing device 6 is provided above the image forming portion 5. The post-processing device 6 performs various processes such as sorting and bundling recording materials discharged from the fixing device 15 shown in FIG. 1. The recording material subjected to various processes by the post-processing device 6 is discharged onto the discharge tray 20.

Reference numeral denotes the image scanner 7 serving as an image reading unit for reading a document image. Reference numeral 7a denotes a document table, reference numeral 7b denotes a pressing plate, and reference numeral 7c denotes a document tray. The image scanner 7, the post-processing device 6, the image forming portion 5, and the feeding apparatus 301 are attached to the image forming apparatus 9.

As shown in FIGS. 2 and 3, the feeding apparatus 301 of this embodiment is configured such that an accommodating tray 4 capable of accommodating a large number of recording materials can be attached to and detached from the main body of the feeding apparatus 301. The accommodating tray 4 is configured to be able to be inserted or pulled out in the direction of the arrow A in FIGS. 2 and 3.

Figure 4:
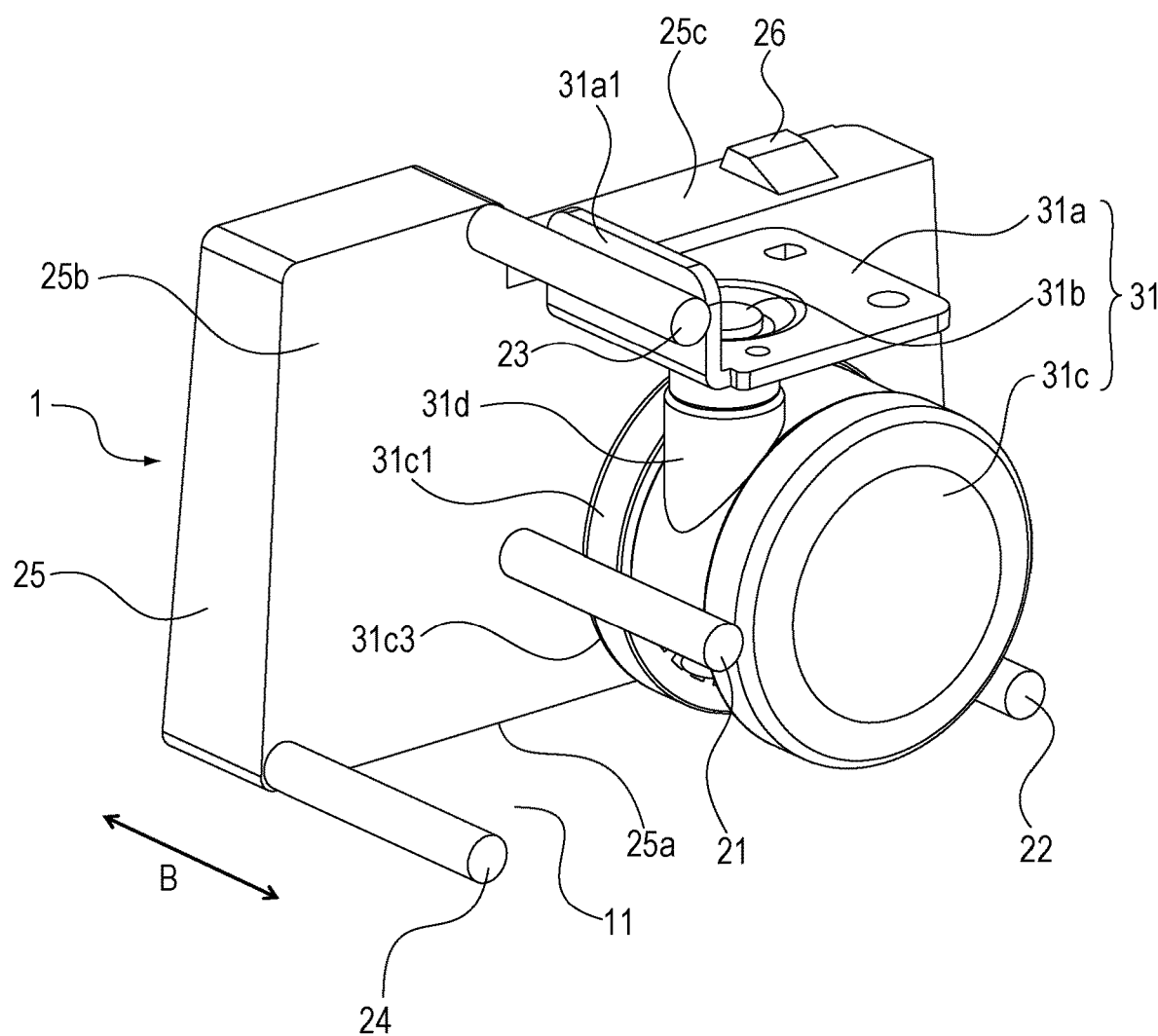
FIG. 4 is a partially enlarged view showing a state in which the tipping prevention unit of the first embodiment is attached to the wheel rotatably provided on the lower surface of the base provided in the lower part of the image forming apparatus.

The base 27 for supporting the entire image forming apparatus 9 is provided at the bottom of the feeding apparatus 301. On the lower surface 27a of the base 27, a holder 31d rotatably supported around a rotating shaft 31b shown in FIG. 4 is provided. In the holder 31d, a wheel 31c is rotatably supported. The wheel 31c is rotatably supported by the base 27 (base portion) via the holder 31d. Since the wheel 31c can freely rotate around the rotating shaft 31b, the entire image forming apparatus 9 can be freely moved by changing its direction to a desired direction.

Tipping Prevention Unit

Next, with reference to FIGS. 2 to 7, the configuration of the first embodiment of the tipping prevention units 1 and 2 according to the present disclosure will be described. FIG. 2 is a perspective explanatory view showing a state in which tipping prevention units 1 and 2 according to the first embodiment are attached to wheels 31c rotatably provided on a lower surface 27a of a base 27 provided in the lower part of the image forming apparatus 9. FIG. 3 is a perspective explanatory view showing a state in which the accommodating tray 4 is pulled out, with the tipping prevention units 1 and 2 of the first embodiment attached to the wheels 31c rotatably provided on the lower surface 27a of the base 27 provided in the lower part of the image forming apparatus 9.

Figure 5:
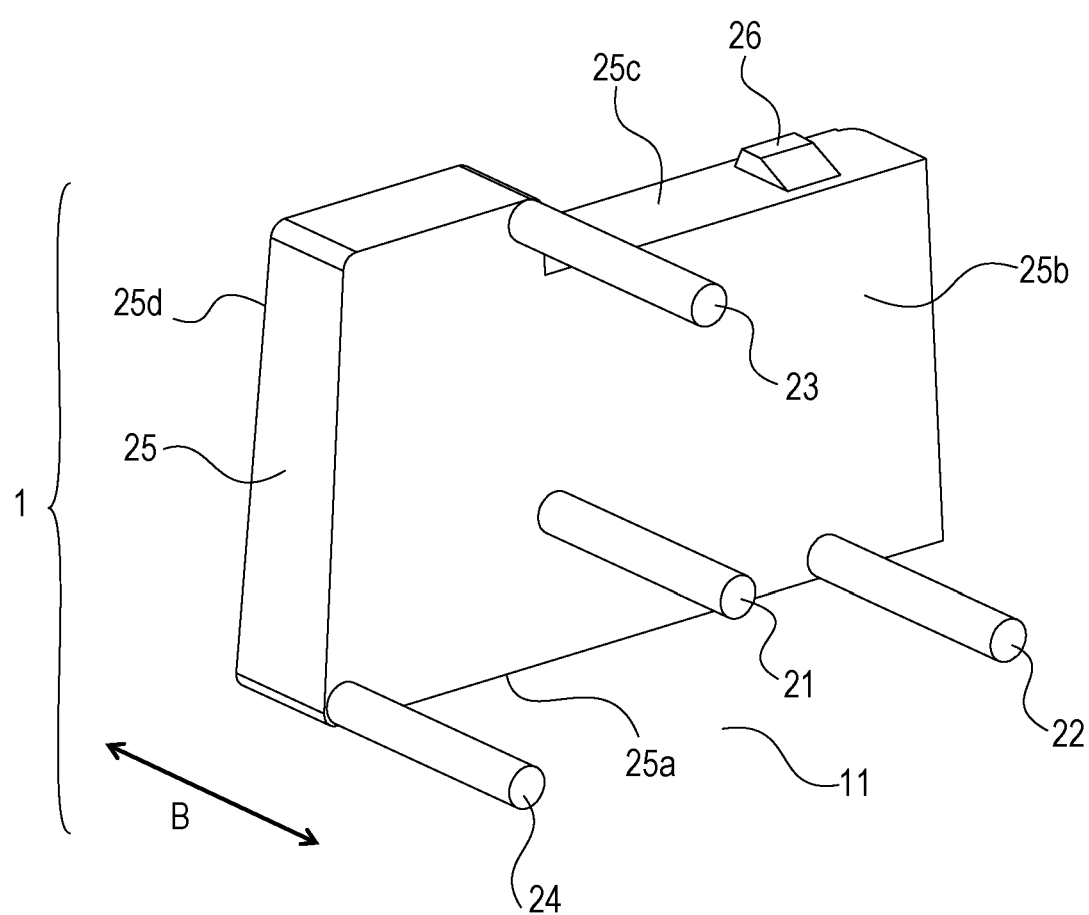
FIG. 5 is a perspective explanatory view showing the configuration of the tipping prevention unit of the first embodiment.
Figure 6:
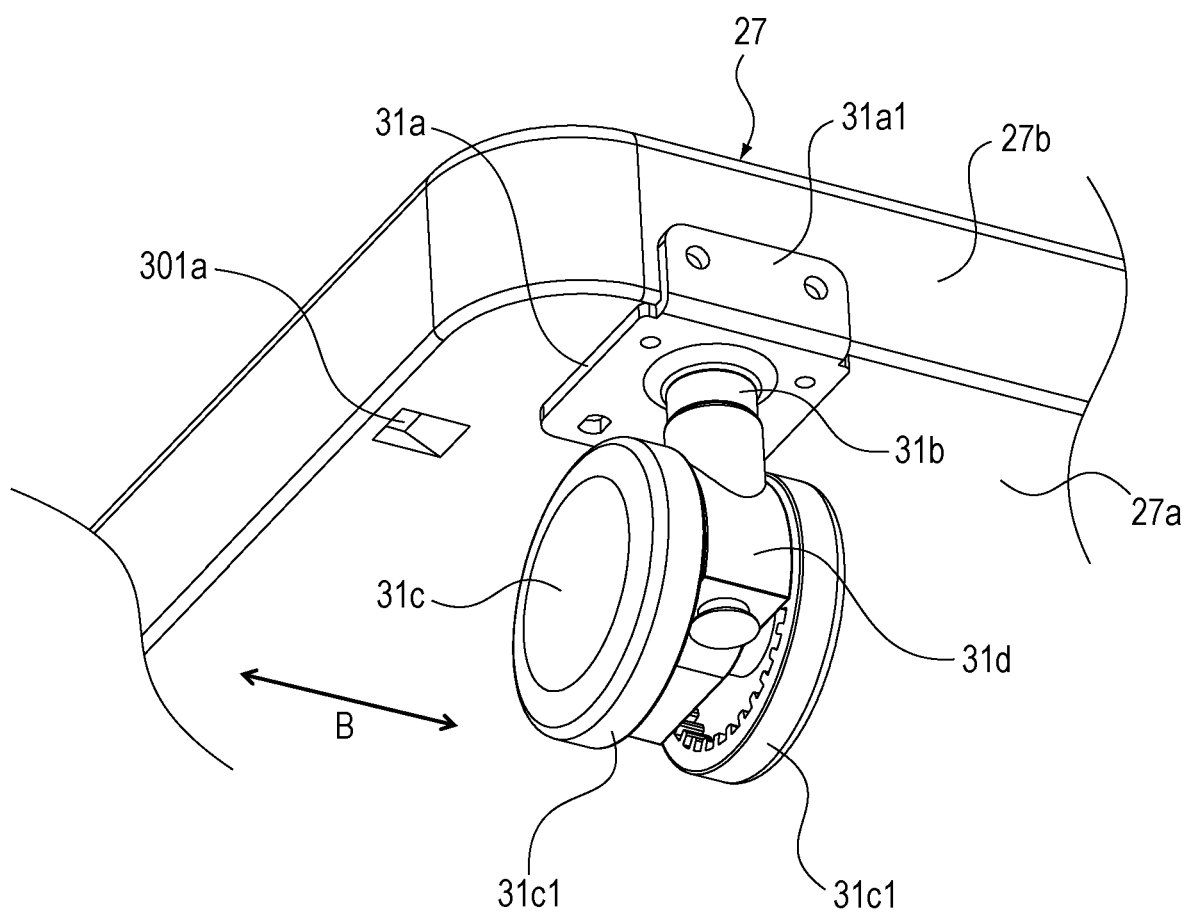
FIG. 6 is a perspective explanatory view showing the configuration of the lower surface of the base provided in the lower part of the image forming apparatus from which the tipping prevention unit of the first embodiment is removed.
Figure 7:
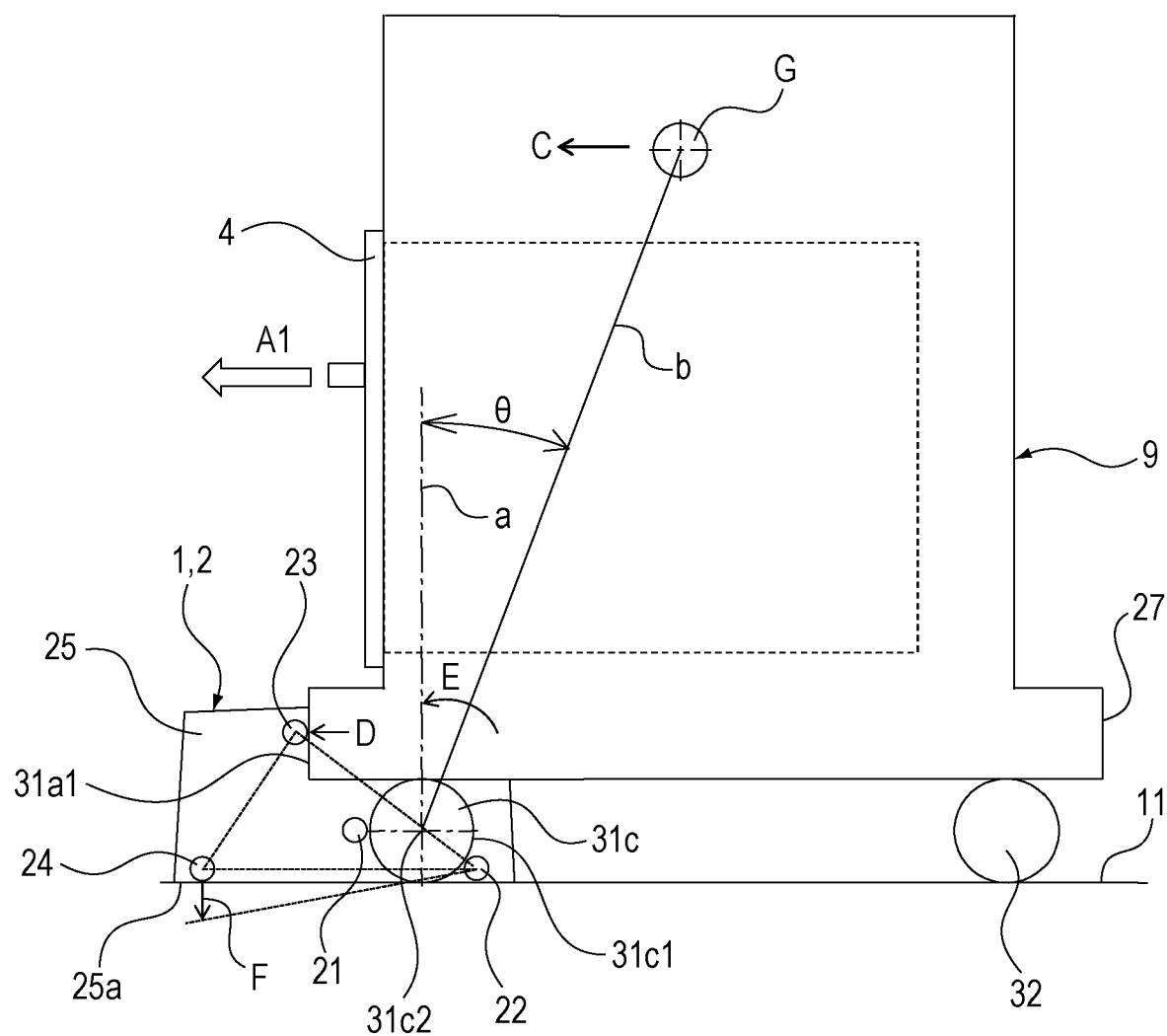
FIG. 7 is a cross-sectional explanatory view for explaining tipping prevention function of the tipping prevention units of the first embodiment.

FIG. 4 is a partially enlarged view showing a state in which the tipping prevention unit 1 of the first embodiment is attached to the wheel 31c rotatably provided on the lower surface 27a of the base 27 provided in the lower part of the image forming apparatus. FIG. 5 is a perspective explanatory view showing the configuration of the tipping prevention unit 1 of the first embodiment. FIG. 6 is a perspective explanatory view showing the configuration of the lower surface 27a of the base 27 provided in the lower part of the image forming apparatus 9 from which the tipping prevention unit 1 of the first embodiment is removed. FIG. 7 is a cross-sectional explanatory view for explaining tipping prevention function of the tipping prevention units 1 and 2 of the first embodiment.

Reference numerals 1 and 2 shown in FIG. 2 denote tipping prevention units that are attached corresponding to the left and right wheels 31c rotatably provided on the lower surface 27a of the base 27 provided in the lower part of the image forming apparatus 9. The tipping prevention unit 1 shown in FIG. 2 is attached corresponding to the left wheel 31c as viewed from the front of the image forming apparatus 9, and the tipping prevention unit 2 is attached corresponding to the right wheel 31c as viewed from the front of the image forming apparatus 9. The tipping prevention units 1 and 2 are not attached to the other wheels 32 but can be attached as needed.

The tipping prevention units 1 and 2 of this embodiment are configured to have bilaterally symmetrical shapes. With reference to FIGS. 4 and 5, a description is given only to the tipping prevention unit 1 attached corresponding to the left wheel 31c as viewed from the front of the image forming apparatus 9. Since the tipping prevention unit 2 is configured to have a shape bilaterally symmetrical to the shape of the tipping prevention unit 1, redundant description will be omitted.

As shown in FIG. 2, in this embodiment, a pair of left and right tipping prevention units 1 and 2 are inserted into the gap between the lower surface 27a of the base 27 and the floor surface 11 from the outside (the left-right direction in FIG. 1) of the side surface 27b of the base 27 provided in the lower part of the image forming apparatus 9 in the direction of the arrow B in FIG. 2. At this time, as shown in FIG. 4, shafts 21 and 22 provided on the tipping prevention units 1 and 2 are disposed so as to face the outer peripheral surfaces 31c1 of the left and right wheels 31c rotatably provided on the lower surface 27a of the base 27. The shafts 21 and 22 are configured as holding portions that abut the outer peripheral surfaces 31c1 of the wheels 31c and hold the wheels 31c of the image forming apparatus 9.

In the case where instead of the wheels 31c, leg portions (not shown) that are placed on the floor surface 11 and support the image forming apparatus 9 are provided below the image forming apparatus 9, shafts 21 and 22 provided in the tipping prevention units 1 and 2 are disposed so as to face the outer peripheral surfaces of the leg portions. The shafts 21 and 22 are configured as holding portions that abut the outer peripheral surfaces of the leg portions and hold the leg portions of the image forming apparatus 9.

Shafts 23 provided in the tipping prevention units 1 and 2 are disposed so as to face abutted portions 31a1 of fixing plates 31a having an L-shaped cross section and fixed to the lower surface 27a of the base 27 provided in the lower part of the image forming apparatus 9. The shafts 23 are configured as abutting portions that abut the abutted portions 31al of the fixing plates 31a fixed to the lower surface 27a of the base 27 provided in the lower part of the image forming apparatus 9, at a position higher than the shafts 21 and 22 (holding portions). That is, the shafts 23 (abutting portions) abut the abutted portions 31a1 of the fixing plates 31a provided on the base 27 at a position closer to the base 27 (base portion) than the shafts 21 and 22 (holding portions).

Two tipping prevention units that are identical to the left or right tipping prevention unit 1 or 2 may be inserted into the gap between the lower surface 27a of the base 27 and the floor surface 11 from the outside (the left-right direction in FIG. 1) of the side surface 27b of the base 27 provided in the lower part of the image forming apparatus 9 in the direction of the arrow B in FIG. 2. Then, the tipping prevention units may be attached by engaging snap-fits 26 with engagement portions 301a.

As shown in FIGS. 4 and 5, the tipping prevention units 1 and 2 each have a side plate 25 provided with a ground contacting surface 25a that contacts the floor surface 11. The side plate 25 forms the main body portion of the tipping prevention unit. The shafts 21 to 24 are provided so as to protrude in a direction perpendicular to the back surface 25b of the side plate 25. As shown in FIG. 4, the shafts 21 and 22 abut the outer peripheral surface 31c1 of the wheel 31c. The shaft 23 abuts the abutted portion 31al of the fixing plate 31a fixed to the lower surface 27a of the base 27 forming a part of the outer wall of the image forming apparatus 9. As shown in FIG. 6, the abutted portion 31al of the fixing plate 31a is fixed to the side surface 27b of the base 27.

The shaft 24 is configured as a ground contacting portion that contacts the floor surface 11 on which the image forming apparatus 9 is placed, at a position further protruding to the outside of the image forming apparatus 9 than the wheel 31c or leg portion (not shown) provided in the lower part of the image forming apparatus 9. That is, the shaft 24 is also a contacting portion that contacts the floor surface 11. The shaft 24 (ground contacting portion) contacts the floor surface 11 at a position away from the wheel 31c or leg portion (not shown). A part of the ground contacting surface 25a that is the lower surface of the side plate 25 is also configured as a ground contacting portion that contacts the floor surface 11 on which the image forming apparatus 9 is placed, at a position further protruding to the outside of the image forming apparatus 9 than the wheel 31c or leg portion (not shown) provided in the lower part of the image forming apparatus 9. The shaft 24 and the ground contacting surface 25a abut the floor surface 11.

The shaft 24 that abuts the floor surface 11 has the same function as the ground contacting surface 25a of the side plate 25 and is intended for reinforcement. Therefore, the shaft 24 can be omitted. A snap-fit 26 is provided on the top surface 25c of the side plate 25. The tipping prevention units 1 and 2 are inserted into the gap between the lower surface 27a of the base 27 and the floor surface 11 from the outside (the left-right direction in FIG. 1) of the side surface 27b of the base 27 provided in the lower part of the image forming apparatus 9 in the direction of the arrow B in FIG. 2. Then, the snap-fit 26 is engaged with and attached to the engagement portion 301a. At that time, the snap-fit 26 provided on the top surface 25c of the side plate 25 is engaged with and fixed to the engagement portion 301a provided in the lower surface 27a of the base 27 shown in FIG. 6.

Reference numeral 31 shown in FIG. 4 denotes a caster unit 31 fixed to the lower surface 27a of the base 27 provided at the bottom of the image forming apparatus 9. The caster unit 31 has the fixing plate 31a fixed to the lower surface 27a of the base 27. The caster unit 31 further has an abutted portion 31al fixed to the side surface 27b of the base 27. The caster unit 31 further has a rotating shaft 31b rotatably supported by the fixing plate 31a. The caster unit 31 further has a holder 31d rotatably supported by the rotating shaft 31b, and a wheel 31c rotatably supported by the holder 31d.

As shown in FIG. 2, the tipping prevention units 1 and 2 are inserted into the gap between the lower surface 27a of the base 27 and the floor surface 11 from the outside (the left-right direction in FIG. 1) of the side surface 27b of the base 27 provided in the lower part of the image forming apparatus 9 in the direction of the arrow B in FIG. 2. Then, the snap-fit 26 is engaged with and attached to the engagement portion 301a. At this time, as shown in FIG. 4, the shafts 21 and 22 provided on the tipping prevention units 1 and 2 abut the outer peripheral surfaces 31c1 of the wheels 31c, and the shaft 23 abuts the abutted portion 31a1 of the fixing plate 31a serving as the outer wall of the image forming apparatus 9.

The tipping prevention units 1 and 2 are provided attachably to and detachably from the lower part of the image forming apparatus 9 from the outside of the side surface 27b of the base 27 in the axial direction of the rotation center 31c2 of the wheel 31c shown in FIG. 7, which is the direction of the rotation axis when the image forming apparatus 9 tips shown by the arrow B in FIG. 2. As shown in FIG. 2, the pair of left and right tipping prevention units 1 and 2 of this embodiment are bilaterally symmetrical in shape.

As shown in FIG. 2, the tipping prevention units 1 and 2 are configured to be attachable and detachable in the direction of the arrow B in FIG. 2. The center of gravity G shown in FIG. 7 is the center of gravity G of the entire image forming apparatus 9. Consider a case where as shown in FIG. 7, the accommodating tray 4 capable of accommodating a large number of recording materials is pulled out in the direction of the arrow A1 in FIG. 7 and the center of gravity G of the entire image forming apparatus 9 is moved in the direction of the arrow C in FIG. 7.

The outer peripheral surfaces 31c1 of the wheels 31c to which the tipping prevention units 1 and 2 are attached are abutted by the shafts 21 and 22 provided in the tipping prevention units 1 and 2. As a result, the wheels 31c are held by the shafts 21 and 22 provided in the tipping prevention units 1 and 2. On the other hand, the abutted portion 31al fixed to the side surface 27b of the base 27 is abutted by the shafts 23 provided on the tipping prevention units 1 and 2.

As shown in FIG. 7, the accommodating tray 4 capable of accommodating a large number of recording materials is pulled out in the direction of the arrow A1 in FIG. 7 and the center of gravity G of the entire image forming apparatus 9 is moved in the direction of arrow C in FIG. 7. Then, the entire image forming apparatus 9 tries to tilt in the direction of arrow E in FIG. 7 around the rotation center 31c2 of the wheel 31c. At this time, in a state in which the wheels 31c are held by the shafts 21 and 22 provided in the tipping prevention units 1 and 2, the abutted portions 31al fixed to the side surface 27b of the base 27 push the shafts 23 provided in the tipping prevention units 1 and 2 in the direction of arrow D in FIG. 7.

At this time, the ground contacting surfaces 25a of the side plates 25 and the outer peripheral surfaces of the shafts 24 are in contact with the floor surface 11. Therefore, the tipping prevention units 1 and 2 do not rotate. Consider a vertical line a perpendicular to the floor surface 11 shown in FIG. 7 and passing through the rotation center 31c2 of the wheel 31c and a straight line b connecting the rotation center 31c2 of the wheel 31c and the center of gravity G of the entire image forming apparatus 9. The angle formed by the vertical line a and the straight line b around the rotation center 31c2 of the wheel 31c is denoted as θ.

When the image forming apparatus 9 shown in FIG. 7 is completely tipped, the angle θ is 0" or less (when the straight line b is positioned on the left side of the vertical line a in FIG. 7). However, when the entire image forming apparatus 9 tries to tilt in the direction of the arrow E in FIG. 7 around the rotational center 31c2 of the wheel 31c with the tipping prevention units 1 and 2 attached thereto, almost simultaneously, the rotating motion due to the tilting of the image forming apparatus 9 is suppressed by the tipping prevention units 1 and 2.

The shafts 21 and 22 provided in the tipping prevention units 1 and 2 abut the outer peripheral surfaces 31c1 of the wheels 31c. As shown in FIG. 7, the shafts 21 and 22 are provided on opposite sides with respect to the rotation center 31c2 of the wheel 31c. In addition to this, as shown in FIG. 4, the back surface 25b of the side plate 25 abut the side surface 31c3 of the wheel 31c. Thereby, the rotation in the horizontal direction around the rotating shaft 31b of the holder 31d which rotatably supports the wheel 31c is suppressed. Therefore, when the entire image forming apparatus 9 tries to tilt in the direction of the arrow E in FIG. 7 around the rotation center 31c2 of the wheel 31c, the tipping prevention units 1 and 2 stably perform the tipping prevention function.

As shown in FIG. 2, it is possible to prevent tipping of a large-sized apparatus such as the image forming apparatus 9 by using the pair of left and right tipping prevention units 1 and 2 having bilaterally symmetrical shapes. As shown in FIG. 5, the shafts 21 to 24 are erected only on the back surface 25b of the side plate 25, and the front surface 25d of the side plate 25 is a flat surface. For this reason, after the pair of bilaterally symmetrical tipping prevention units 1 and 2 are attached to the base 27 provided at the bottom of the image forming apparatus 9, since the front surface 25d, which is a flat surface, of the side plate 25 faces outward, the appearance as seen from the side surface side of the image forming apparatus 9 is good.

In this embodiment, an example in which the image forming apparatus 9 has the wheels 31c capable of moving the image forming apparatus 9 has been described. However, even when the image forming apparatus 9 has, instead of the wheels 31c, fixed legs only for supporting the main body of the image forming apparatus 9 at a fixed position on the floor surface 11, the same effect can be obtained.

According to this embodiment, the pair of left and right tipping prevention units 1 and 2 are inserted into the gap between the lower surface 27a of the base 27 and the floor surface 11 from the outside (the left-right direction in FIG. 1) of the side surface 27b of the base 27 provided in the lower part of the image forming apparatus 9 in the direction of the arrow B in FIG. 2. Then, the snap-fit 26 provided on the top surface 25c of the side plate 25 is engaged with and attached and fixed to the engagement portion 301a provided in the lower surface 27a of the base 27. As a result, the tipping prevention units 1 and 2 for preventing the image forming apparatus 9 from tipping can be easily attached, are compact in configuration, and can be used without impairing the functions and operability of the respective devices optionally attached to the image forming apparatus 9.

In addition, when the user operates each device optionally attached to the image forming apparatus 9, the center of gravity G of the entire image forming apparatus 9 may move. Even in that case, the shafts 21 and 22 provided on the side plates 25 of the tipping prevention units 1 and 2 abut the outer peripheral surfaces 31c1 of the respective wheels 31c. Therefore, the rotation of the wheels 31c can be suppressed.

A part of the ground contacting surface 25a provided on each side plate 25 and the shaft 24 further protrude in the direction of the arrow A1 in FIG. 7 than the rotation center 31c2 of each wheel 31c. As a result, even in a case where the center of gravity G of the entire image forming apparatus 9 moves in the direction of the arrow C in FIG. 7 and the entire image forming apparatus 9 tries to rotate in the direction of the arrow E in FIG. 7 around the rotation center 31c2 of each wheel 31c, a part of the ground contacting surface 25a of each side plate 25 and the shaft 24 press the floor surface 11 in the direction of the arrow F in FIG. 7 so that the entire image forming apparatus 9 can be prevented from rotating and tilting around the rotation center 31c2 of each wheel 31c in the direction of the arrow E in FIG. 7. The tipping of the image forming apparatus 9 can thereby be prevented.

The tipping prevention units 1 and 2 can be inserted into the gap between the lower surface 27a of the base 27 and the floor surface 11 from the outside of the side surface 31c3 of the wheel 31c. Therefore, irrespective of the configuration of each device optionally attached to the image forming apparatus 9, the user can easily attach the tipping prevention units 1 and 2, which are compact in configuration and can be used without impairing the functions and operability of the respective devices optionally attached to the image forming apparatus 9.

The shafts 21 and 22 (holding portion), the shaft 23 (abutting portion), and the shaft 24 (ground contacting portion) of the tipping prevention unit 1 shown in FIG. 4 are configured as locking members for locking the movement of the wheel 31c. The feeding apparatus 301 is configured to include these locking members, a feeding portion that feeds a recording material (not shown), the base 27 (base portion), and the wheels 31c.

MODIFICATION EXAMPLE

Figure 8:
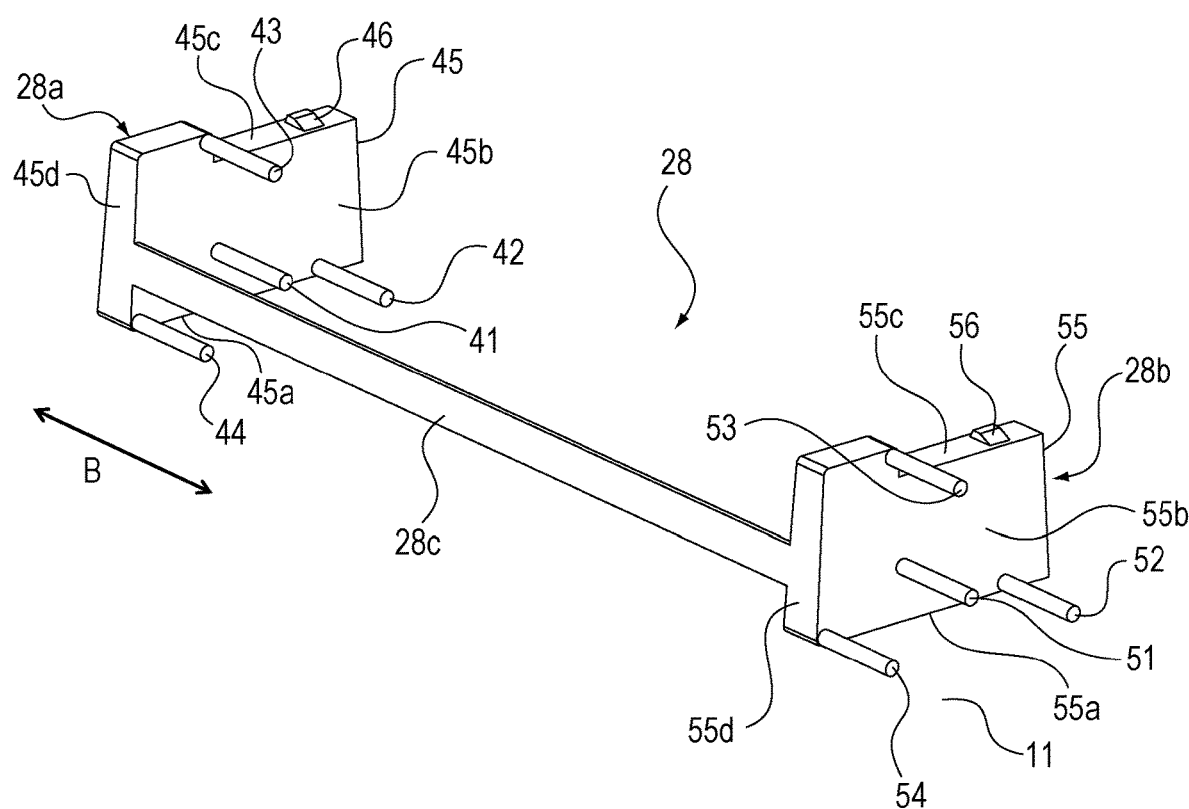
FIG. 8 is a perspective view showing a modification example of the tipping prevention unit of the first embodiment.

Next, the configuration of a tipping prevention unit 28 of a modification example of the first embodiment will be described with reference to FIG. 8. FIG. 8 is a perspective explanatory view showing the configuration of a tipping prevention unit 28 according to a modification example of the first embodiment. In the first embodiment shown in FIG. 2 and described above, a pair of bilaterally symmetrical tipping prevention units 1 and 2 that are two parts are inserted and attached from the outside of both the left and right side surfaces 27b of the base 27 provided at the bottom of the image forming apparatus 9.

The tipping prevention unit 28 of the modification example shown in FIG. 8 is an example in which a pair of left and right tipping prevention members 28a and 28b (tipping prevention units) having the same shape are integrally provided. The tipping prevention unit 28 is such one part that left and right tipping prevention members 28a and 28b having the same shape and facing in the same direction are connected and integrated by a frame 28c. The tipping prevention unit 28 shown in FIG. 8 can be inserted and attached from the side of one side surface 27b of the base 27 provided at the bottom of the image forming apparatus 9.

The tipping prevention members 28a and 28b shown in FIG. 8 have side plates 45 and 55, respectively. On the right side surfaces 45b and 55b of the side plates 45 and 55, shafts 41, 42, 51, and 52 serving as holding portions are erected. The shafts 41, 42, 51, and 52 abut the outer peripheral surfaces 31c1 of the wheels 31c provided at the bottom of the image forming apparatus 9 or the outer peripheral surfaces of leg portions (not shown) to hold the wheels 31c or the leg portions (not shown).

Further, on the right side surfaces 45b and 55b of the side plates 45 and 55, shafts 43 and 53 serving as abutting portions are erected. The shafts 43 and 53 (abutting portions) abut the abutted portions 31a1 fixed to the side surface 27b of the base 27 serving as an outer casing of the image forming apparatus 9, at a position higher than the shafts 41, 42, 51, and 52 (holding portions).

Further, on the right side surfaces 45b and 55b of the side plates 45 and 55, there are erected shafts 44 and 54 serving as ground contacting portions that contact the floor surface 11 on which the image forming apparatus 9 is placed, at a position further protruding to the outside of the image forming apparatus 9 than the wheels 31c or the leg portions (not shown). The shafts 44 and 54 (ground contacting portions) contact the floor surface 11 at a position away from the wheels 31c or the leg portions (not shown). Parts of the ground contacting surfaces 45a and 55a that are the lower surfaces of the side plates 45 and 55 are also configured as ground contacting portions that contact the floor surface 11 on which the image forming apparatus 9 is placed, at a position further protruding to the outside of the image forming apparatus 9 than the wheels 31c or the legs (not shown).

The shafts 41, 42, 51, and 52 abut the outer peripheral surfaces 31c1 of the wheels 31c. The shafts 43 and 53 abut the abutted portions 31a1 fixed to the side surface 27b of the base 27 serving as an outer casing of the image forming apparatus 9. The shafts 44 and 54 each abut the floor surface 11. The side plates 45 and 55 correspond to the side plates 25 of the first embodiment shown in FIG. 5 and described above, and the left and right side plates 45 and 55 have substantially the same shape and are integrally connected by the frame 28c to form the tipping prevention unit 28.

The shafts 41 to 44 and 51 to 54 are provided perpendicularly to the right side surfaces 45b and 55b of the side plates 45 and 55 of the tipping prevention unit 28. The ground contacting surfaces 45a and 55a that are the bottom surfaces of the side plates 45 and 55, and the shafts 42, 44, 52, and 54 abut the floor surface 11 on which the image forming apparatus 9 is placed. The right side surfaces 45b and 55b of the side plates 45 and 55 abut the side surfaces 31c3 of the wheels 31c shown in FIG. 4 and described above.

The tipping prevention unit 28 shown in FIG. 8 is inserted between the lower surface 27a of the base 27 of the image forming apparatus 9 and the floor surface 11 from the direction of the arrow B shown in FIGS. 6 and 8. The snap-fits 46 and 56 provided on the top surfaces 45c and 55c of the side plates 45 and 55 are engaged with engagement portions 301a provided in the lower surface 27a of the base 27 of the image forming apparatus 9, and the tipping prevention unit 28 is thereby fixed to the lower surface 27a of the base 27 of the image forming apparatus 9.

The tipping prevention unit 28 of this embodiment can be easily attached from one direction of the image forming apparatus 9. The tipping prevention unit 28 of this embodiment is also provided attachably to and detachably from the lower part of the image forming apparatus 9 from the direction of the rotation axis when the image forming apparatus 9 tilts (the axial direction of the rotation center 31c2 of the wheel 31c in FIG. 7).

Then, as shown in FIG. 7 and described above, the accommodating tray 4 capable of accommodating a large number of recording materials is pulled out in the direction of the arrow A1 in FIG. 7, and recording materials are replenished in the accommodating tray 4. At this time, the center of gravity G of the entire image forming apparatus 9 moves in the direction of the arrow C in FIG. 7. Also in this case, rotation of the main body of the image forming apparatus 9 can be suppressed and tipping can be prevented. Even if the center of gravity G of the entire image forming apparatus 9 is moved when a user operates various devices optionally attached to the main body of the image forming apparatus 9, rotation of the main body of the image forming apparatus 9 can be suppressed and tipping can be prevented.

As shown in FIG. 8, the tipping prevention unit 28 of this embodiment is formed by connecting and integrating left and right tipping prevention members 28a and 28b with a frame 28c. Thereby, the operation of inserting and attaching the tipping prevention unit 28 between the lower surface 27a of the base 27 of the image forming apparatus 9 and the floor surface 11 can be completed at once. Furthermore, the user's toe can be prevented from entering between the lower surface 27a of the base 27 of the image forming apparatus 9 and the floor surface 11 by the frame 28c provided flush with the front surfaces 45d and 55d of the side plates 45 and 55.

The shafts 41, 42, 51, and 52 (holding portions), the shafts 43 and 53 (abutting portions), and the shafts 44 and 54 (ground contacting portions) of the tipping prevention unit 28 shown in FIG. 8 are configured as locking members for locking the movement of the wheels 31c. The feeding apparatus 301 is configured to include these locking members, a feeding portion that feeds a recording material (not shown), the base 27 (base portion), and the wheels 31c.

Second Embodiment

Figure 9:
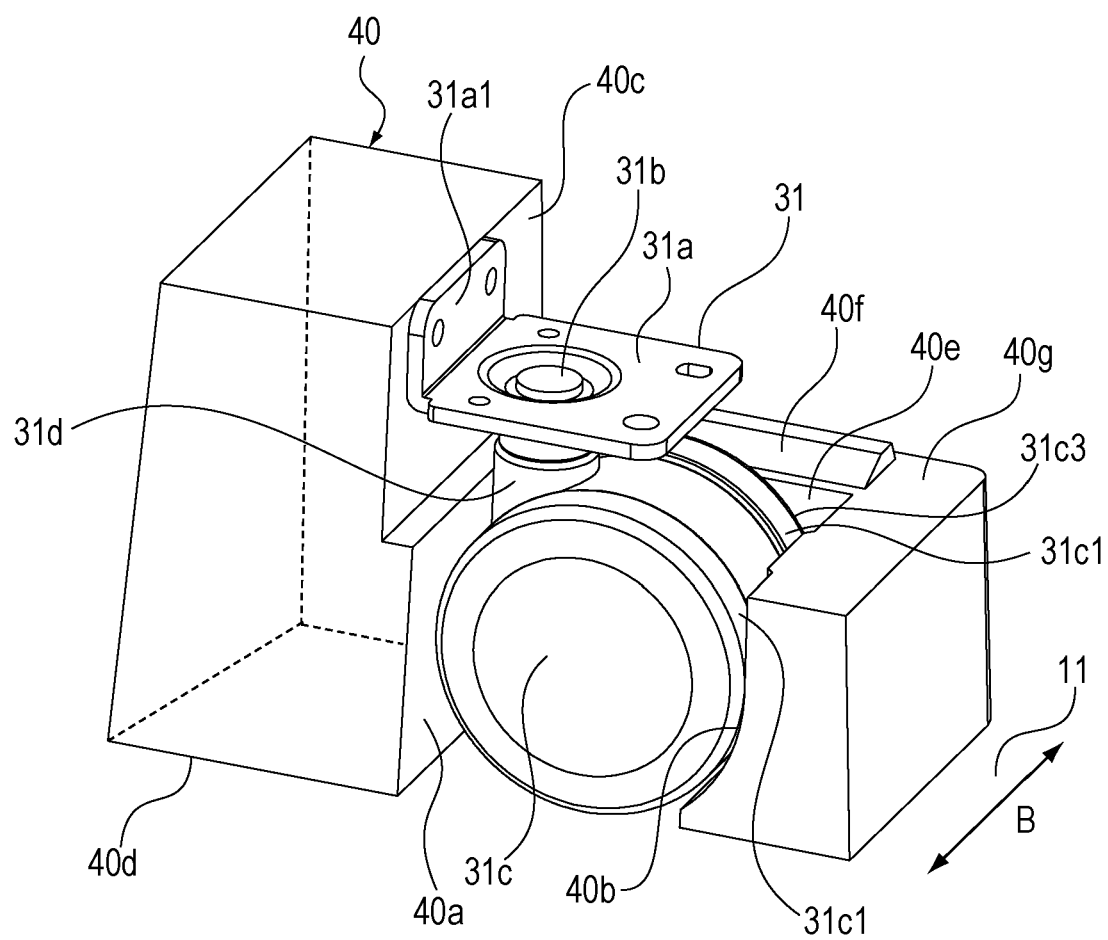
FIG. 9 is a partially enlarged view showing a state in which a tipping prevention unit of a second embodiment is attached to the image forming apparatus.
Figure 10:
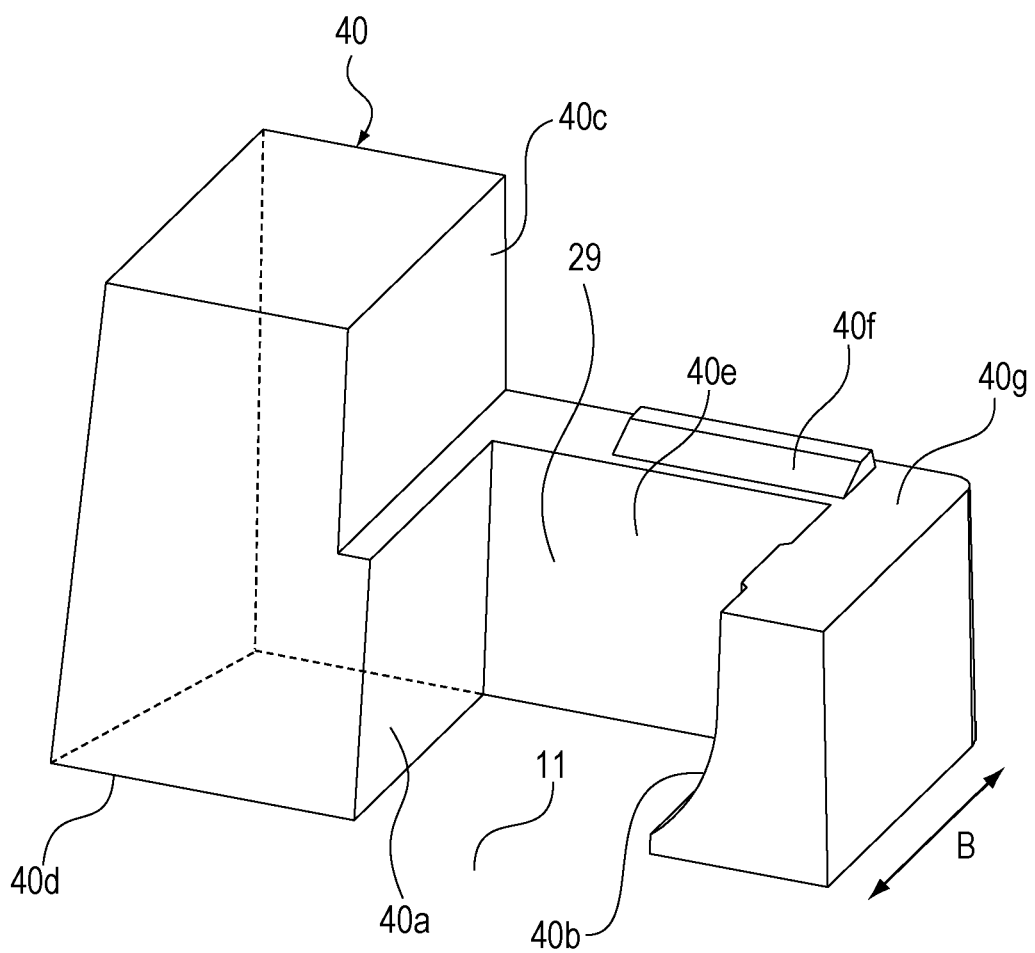
FIG. 10 is a perspective explanatory view showing the configuration of the tipping prevention unit of the second embodiment.

Next, with reference to FIGS. 9 and 10, the configuration of a feeding apparatus having a tipping prevention unit according to a second embodiment of the present disclosure will be described. The same components as those in the first embodiment are given the same reference numerals or the same names but different reference numerals, and the description thereof will be omitted. FIG. 9 is a partially enlarged view showing a state in which a tipping prevention unit 40 of this embodiment is attached to the image forming apparatus 9. FIG. 10 is a perspective explanatory view showing the configuration of the tipping prevention unit 40 of this embodiment.

In the first embodiment and modification example, the shafts 21 to 24, the shafts 41 to 44, and the shafts 51 to 54 are erected on and fixed to the side plates 25, 45 and 55. This embodiment is a molding of a synthetic resin (plastic) or the like having, instead of the shafts 21 to 24, the shafts 41 to 44, and the shafts 51 to 54, wall surfaces 40a to 40c and a ground contacting surface 40d having the same mechanism.

As shown in FIG. 9 and FIG. 10, the tipping prevention unit 40 of this embodiment is provided with a wall surface 40a that is a flat surface, instead of the shaft 21 shown in FIG. 5 and described above. A curved wall surface 40b is provided instead of the shaft 22 shown in FIG. 5 and described above. As shown in FIG. 9, the wall surface 40a and the wall surface 40b are provided on opposite sides with respect to the rotation center 31c2 of the wheel 31c. The wall surface 40a and the wall surface 40b abut the outer peripheral surface 31c1 of the wheel 31c. The wall surface 40a and the wall surface 40b are configured as holding portions that hold the wheel 31c or a leg portion (not shown) provided in the lower part of the image forming apparatus 9.

Instead of the shaft 23 shown in FIG. 5 and described above, a flat wall surface 40c is provided. The wall surface 40c abuts the abutted portion 31a*l* of the fixing plate 31a fixed to the lower surface 27a of the base 27 forming a part of the outer wall of the image forming apparatus 9. The wall surface 40c is configured as an abutting portion that abuts the abutted portion 31a*l* of the fixing plate 31a fixed to the lower surface 27a of the base 27 forming a part of the outer wall of the image forming apparatus 9, at a position higher than the wall surfaces 40a and 40b (holding portions). That is, the wall surface 40c (abutting portion) abuts the abutted portion 31a*l* of the fixing plate 31a provided on the base 27 at a position closer to the base 27 (base portion) than the wall surfaces 40a and 40b (holding portions).

A flat ground contacting surface 40d is provided instead of the shaft 24 shown in FIG. 5 and described above. The ground contacting surface 40d is configured as a bottom surface of the tipping prevention unit 40 and abuts the floor surface 11 on which the image forming apparatus 9 is placed. The ground contacting surface 40d is configured as a ground contacting portion that contacts the floor surface 11 on which the image forming apparatus 9 is placed, at a position further protruding to the outside of the image forming apparatus 9 than the wheel 31c or leg portion (not shown) provided in the lower part of the image forming apparatus 9.

A snap-fit 40f is provided on the top surface 40g of the tipping prevention unit 40. The snap-fit 40f is engaged with, attached to, and fixed to an engagement portion that is engageable with the snap-fit 40f and that is similar to the engagement portion 301a provided in the lower surface 27a of the base 27 provided at the bottom of the image forming apparatus 9 as shown in FIG. 6 and described above.

The tipping prevention unit 40 of this embodiment is also provided attachably to and detachably from the lower part of the image forming apparatus 9 from the axial direction of the rotation center 31c2 of the wheel 31c shown in FIG. 7 which is the direction of the rotation axis when the image forming apparatus 9 tilts (the direction of the arrow B in FIGS. 9 and 10). As shown in FIG. 9, in a state in which the wheel 31c is inserted into the space 29 provided between the wall surface 40a and the wall surface 40b of the tipping prevention unit 40, the wall surface 40e abuts the side surface 31c3 of the wheel 31c.

The wall surfaces 40a and 40b (holding portions), the wall surface 40c (abutting portion), the ground contacting surface 40d (ground contacting portion), and the wall surface 40e of the tipping prevention unit 40 of this embodiment are integrally formed by integrally molding a synthetic resin. The tipping prevention unit 40 of this embodiment has, instead of the shafts 21 to 24 shown in FIG. 4 and described above and the shafts 41 to 44 and the shafts 51 to 54 shown in FIG. 8 and described above, the wall surfaces 40a to 40c and the ground contacting surface 40d having the same mechanism. These are formed by molding a synthetic resin (plastic) or the like. Therefore, the tipping prevention unit 40 is inexpensive, has good designability, and can be reduced in weight.

The wall surfaces 40a and 40b (holding portions), the wall surface 40c (abutting portion), and the ground contacting surface 40d (ground contacting portion) of the tipping prevention unit 40 shown in FIG. 9 are configured as locking members for locking the movement of the wheel 31c. The feeding apparatus 301 is configured to include these locking members, a feeding portion that feeds a recording material (not shown), a base 27 (base portion), and a wheel 31c. Other configurations are the same as in the first embodiment, and the same effect can be obtained.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-020048 filed Feb. 7, 2017, which is hereby incorporated by reference herein in its entirety.

What is claimed is:

1. A tipping prevention unit mounted on an image forming apparatus having a wheel and for preventing tipping of the image forming apparatus, comprising:
    a main body portion of the tipping prevention unit;
    a first holding shaft protruding from the main body portion, the first holding shaft contacting a wheel of the apparatus;
    a second holding shaft protruding from the main body portion, the second holding shaft contacting the wheel of the image forming apparatus,
    wherein the second holding shaft is arranged at a position higher than the first holding shaft,
    an abutting shaft protruding from the main body portion, the abutting shaft abutting the image forming apparatus at a position higher than the first holding shaft and the second holding shaft;
    a contacting shaft protruding from the main body portion, the contacting shaft contacting a floor surface on which the image forming apparatus is placed,
    wherein respective central axes of the first holding shaft, abutting shaft, and contacting shaft form endpoints of an imaginary triangular area and the second holding shaft is located entirely within the triangular area;
    wherein the first holding shaft, the second shaft, the abutting shaft, and the contacting shaft each have a proximal end connected to the main body and a free distal end,
    wherein the first holding shaft and the second holding shaft regulate a rotation of the wheel by each coming into contact with the wheel, and
    wherein the first holding shaft, the second shaft, the abutting shaft, and the contacting shaft are parallel with respect to each other.

2. The tipping prevention unit according to claim 1,
    wherein the contacting shaft contacts with the floor surface where the image forming apparatus is placed on at a portion away from the wheel.

3. The tipping prevention unit according to claim 1,
    wherein the main body portion, the first holding shaft, the second holding shaft, the abutting shaft, and the contacting shaft are integral.

4. The tipping prevention unit according to claim 1,
    wherein the tipping prevention unit can be attached to and detached from the image forming apparatus from a direction of an axis of the contacting shaft.

* * * * *